US011001648B2

(12) United States Patent
Nguyen et al.

(10) Patent No.: US 11,001,648 B2
(45) Date of Patent: *May 11, 2021

(54) TREATMENT OF EPOXIDIZED UNSATURATED ISOOLEFIN COPOLYMERS

(71) Applicant: ARLANXEO Singapore Pte. Ltd., Singapore (SG)

(72) Inventors: Paul Nguyen, London (CA); Treena Crockett, Strathroy (CA); Gregory J. E. Davidson, London (CA); Sharon Guo, London (CA)

(73) Assignee: ARLANXEO Singapore Pte. Ltd., Singapore (SG)

( * ) Notice: Subject to any disclaimer, the term of this patent is extended or adjusted under 35 U.S.C. 154(b) by 242 days.

This patent is subject to a terminal disclaimer.

(21) Appl. No.: 16/063,334

(22) PCT Filed: Dec. 14, 2016

(86) PCT No.: PCT/CA2016/051479
§ 371 (c)(1),
(2) Date: Nov. 20, 2018

(87) PCT Pub. No.: WO2017/100924
PCT Pub. Date: Jun. 22, 2017

(65) Prior Publication Data
US 2019/0077889 A1    Mar. 14, 2019

(30) Foreign Application Priority Data

Dec. 17, 2015  (EP) .................................. 15200717

(51) Int. Cl.
*C08F 8/08* (2006.01)
*C08F 8/12* (2006.01)
(Continued)

(52) U.S. Cl.
CPC .................. *C08F 8/08* (2013.01); *C08F 8/00* (2013.01); *C08F 8/12* (2013.01); *C08F 210/12* (2013.01);
(Continued)

(58) Field of Classification Search
CPC ................................. C08F 210/12; C08F 8/08
See application file for complete search history.

(56) References Cited

U.S. PATENT DOCUMENTS 2,356,128 A   8/1944  Thomas et al.
2,701,895 A   2/1955  Tawney et al.
(Continued)

FOREIGN PATENT DOCUMENTS

CA   2414932 A1   6/2003
CA   2557225 A1   2/2007
(Continued)

OTHER PUBLICATIONS

Chembook site on amino trismethylene phosphonic acid (Year: 2020).*
(Continued)

*Primary Examiner* — Mark S Kaucher
(74) *Attorney, Agent, or Firm* — The Dobrusin Law Firm, P.C.

(57) ABSTRACT

A process for producing a crosslinked polymer involves contacting an epoxidized unsaturated isoolefin copolymer with a catalytic amount of an acid in an absence of a solvent. A process for producing a hydroxylated unsaturated isoolefin copolymer involves contacting an epoxidized unsaturated isoolefin copolymer with a catalytic amount of an acid in an absence of a solvent. A hydroxylated unsaturated isoolefin copolymer having hydroxyl groups in endo configurations may be produced thereby.

20 Claims, 4 Drawing Sheets

(51) Int. Cl.
*C08J 3/28* (2006.01)
*C08F 8/00* (2006.01)
*C08J 3/20* (2006.01)
*C08J 3/24* (2006.01)
*C08K 5/095* (2006.01)
*C08F 210/12* (2006.01)
*C08F 236/08* (2006.01)

(52) U.S. Cl.
CPC ............ *C08F 236/08* (2013.01); *C08J 3/203* (2013.01); *C08J 3/24* (2013.01); *C08J 3/28* (2013.01); *C08K 5/095* (2013.01); *C08F 2810/20* (2013.01); *C08F 2810/50* (2013.01); *C08J 2323/22* (2013.01); *C08J 2323/30* (2013.01)

(56) References Cited

U.S. PATENT DOCUMENTS

| | | | |
|---|---|---|---|
| 3,093,613 | A | 6/1963 | Fusco et al. |
| 3,165,496 | A | 1/1965 | Fusco et al. |
| 3,551,518 | A | 12/1970 | Pornin |
| 5,242,989 | A | 9/1993 | Bening et al. |
| H1597 | H | 9/1996 | Erickson |
| 5,886,106 | A | 3/1999 | Sumner et al. |
| 2003/0139537 | A1* | 7/2003 | Scholz ................ C08C 19/06 525/386 |
| 2007/0276062 | A1 | 11/2007 | Tirelli et al. |
| 2010/0292411 | A1 | 11/2010 | Nakajima et al. |
| 2013/0345367 | A1 | 12/2013 | Stojcevic et al. |
| 2014/0357794 | A1 | 12/2014 | Mazumdar et al. |
| 2015/0315299 | A1 | 11/2015 | Nguyen |
| 2016/0121654 | A1 | 5/2016 | Shibata |
| 2018/0362683 | A1* | 12/2018 | Elliott ................... C08K 5/14 |
| 2019/0002597 | A1 | 1/2019 | Binder et al. |

FOREIGN PATENT DOCUMENTS

| | | | |
|---|---|---|---|
| CA | 2807735 | A1 | 2/2012 |
| CA | 2894418 | A1 | 6/2014 |
| CN | 1263902 | A | 8/2000 |
| FR | 1383947 | A | 1/1965 |
| GB | 774765 | A | 5/1957 |
| WO | 94/00499 | A1 | 1/1994 |

OTHER PUBLICATIONS

International Search Report and Written from International Application No. PCT/CA2016/051477, dated Feb. 22, 2017.
International Preliminary Report on Patentability from International Application No. PCT/CA2016/051477, dated Jun. 19, 2018.
Ullmanns Encyclopedia of Industrial Chemistry, vol. A 23, 1993, pp. 288-295.
Aubert Y, Coran, Encyclopedia of Polymer Science and Engineering, vol. 17, Transitions and Relaxations to Zwitterionic Polymerization, Vulcanization, 1990, John Wiley & Sons, vol. 17, pp. 666-698.
"Rubber Technology" (Third Edition) by Maurice Morton, Chapter 10 (Van Nostrand Reinhold Company © 1987), particularly pp. 297-300.
International Search Report and Written from International Application No. PCT/CA2016/051479, dated Mar. 7, 2017.
International Preliminary Report on Patentability from International Application No. PCT/CA2016/051479, dated Jun. 19, 2018.
International Search Report and Written from International Application No. PCT/CA2016/051478, dated Mar. 6, 2017.
International Preliminary Report on Patentability from International Application No. PCT/CA2016/051478, dated Jun. 19, 2018.
European Search Report, EP Patent Application No. 15200726 dated Jul. 13, 2016.
European Search Report, EP Patent Application No. 15200728 dated Jul. 22, 2016.
European Search Report, EP Patent Application No. 15200717 dated Jul. 21, 2016.
Commonly owned U.S. Appl. No. 16/063,327, filed Jun. 18, 2018, and published as US 2018/0362683 on Dec. 20, 2018.
Commonly owned U.S. Appl. No. 16/063,310, filed Jun. 18, 2018, and published as US 2019/0002597 on Jan. 3, 2019.
Puskas, J.E. et al. "Rubber Chemistry and Technology" vol. 67(2) pp. 329-341 (Year: 1994).

* cited by examiner

TREATMENT OF EPOXIDIZED UNSATURATED ISOOLEFIN COPOLYMERS

FIELD

This application relates to polymers, in particular to processes for treating epoxidized unsaturated isoolefin copolymers and products produced therefrom.

BACKGROUND

Poly(isobutylene-co-isoprene), or IIR, is a synthetic elastomer commonly known as butyl rubber which has been prepared since the 1940's through the random cationic copolymerization of isobutylene with small amounts of isoprene (1-5 mole %). As a result of its molecular structure, IIR possesses superior air impermeability, a high loss modulus, oxidative stability and extended fatigue resistance.

Butyl rubber is understood to be a copolymer of an isoolefin and one or more, preferably conjugated, multiolefins as comonomers. Commercial butyl comprises a major portion of isoolefin and a minor amount, usually not more than 2.5 mol %, of a conjugated multiolefin. Butyl rubber or copolymer is generally prepared in a slurry process using methyl chloride as a diluent and a Friedel-Crafts catalyst as part of the polymerization initiator. This process is further described in U.S. Pat. No. 2,356,128 and Ullmanns Encyclopedia of Industrial Chemistry, volume A 23, 1993, pages 288-295, the entire contents of which are herein incorporated by reference.

Functionalization of polyisobutylene-co-isoprene (butyl rubber) is of great interest due to its potential applications in technology areas such as surface modification, adhesion, drug delivery, compatibilization of polymer blends, and motor oil and fuel additives, and in providing clean cured products without contaminant leaching and/or side products. Recent advancement in the functionalization of butyl rubber has gained considerable interest especially in the field of grafting of poly(ethylene oxide) (PEO) onto epoxidized butyl polymer due to the potential application in biomedical applications as well as the enhanced mechanical properties, increased wettability, microphase separation, and emulsifying properties observed in these polymers.

Typically, reactions involving epoxidized butyl polymer have been performed in solution. For example, US 2013/0345367 published Dec. 26, 2013 describes a reaction where epoxidized butyl rubber was reacted with a catalytic amount of concentrated aqueous HCl in toluene at room temperature to afford a ring-opened product.

Still, there remains a need for improved processes involving epoxidized butyl rubber to produce products.

SUMMARY

There is provided a process for producing a crosslinked polymer, comprising contacting an epoxidized unsaturated isoolefin copolymer with a catalytic amount of an acid in an absence of a solvent.

There is provided a process for producing a hydroxylated unsaturated isoolefin copolymer, comprising contacting an epoxidized unsaturated isoolefin copolymer with a catalytic amount of an acid in an absence of a solvent.

There is provided a hydroxylated unsaturated isoolefin copolymer comprising hydroxyl groups in endo configurations.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1:
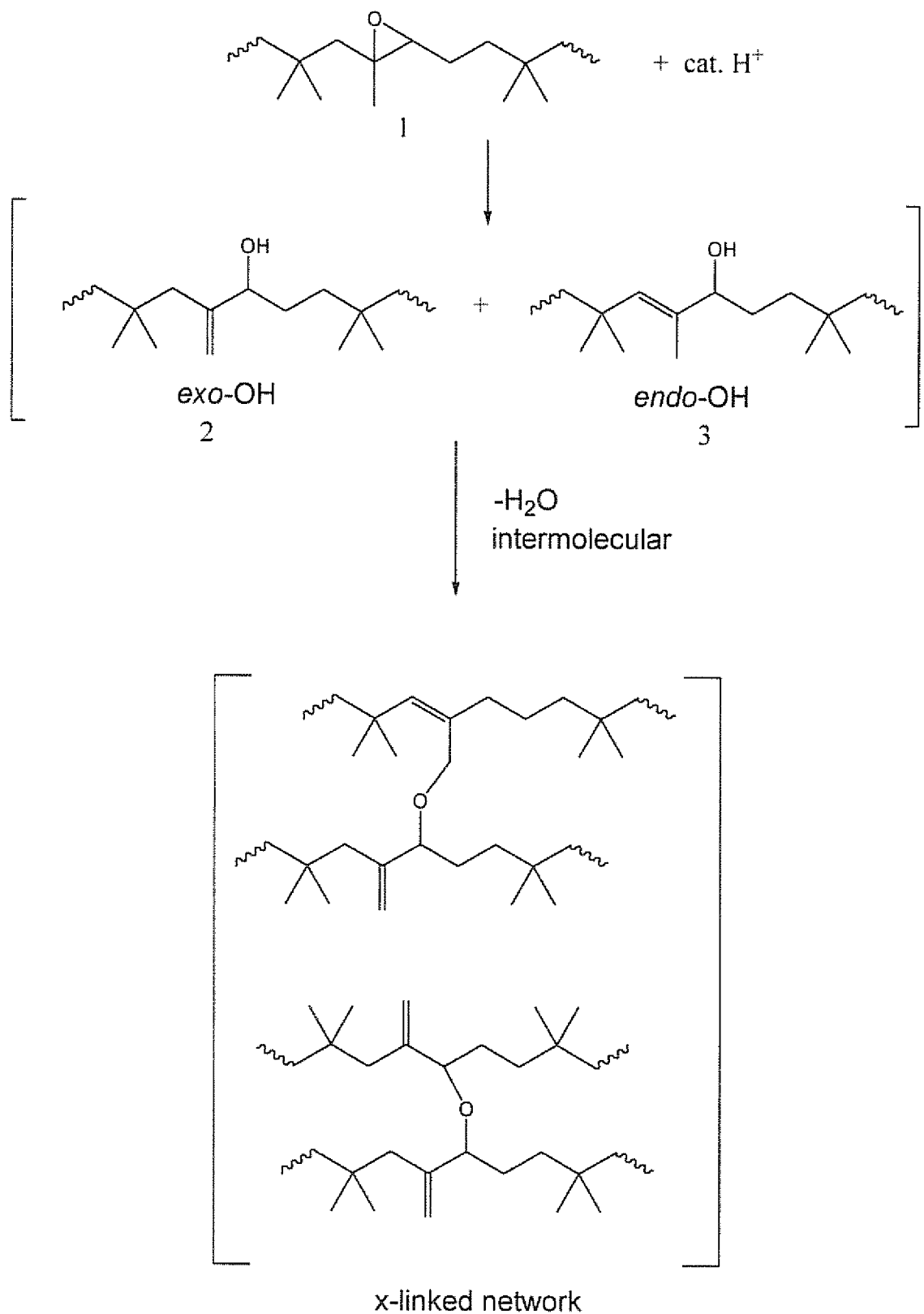
FIG. 1 depicts a reaction scheme for crosslinking of epoxidized butyl rubber catalyzed by a strong acid in an absence of solvent to produce a crosslinked network of butyl rubber polymers.

In accordance with the present invention, a process for producing a hydroxylated unsaturated isoolefin copolymer comprises contacting an epoxidized unsaturated isoolefin copolymer with a catalytic amount of an acid in an absence of a solvent. The epoxidized unsaturated isoolefin copolymer may be contacted with the acid by mixing the two together to form a polymer compound, for example in a mixer, and allowing the acid to catalyze ring-opening of epoxide functional groups to produce hydroxyl groups on the unsaturated isoolefin copolymer. Further reaction under the same conditions can then produce a crosslinked polymer. The epoxidized unsaturated polymer may be in a solid state, but typically has sufficient processability in a mixer to permit mixing with the acid. Suitable mixers include, for example, paddle mixers, sonic agitators, mills (e.g. ball mills, roll mills), Banbury™ mixers, Brabender™ mixers, extruders (e.g. single screw, twin screw), rotary mixers and the like.

In one embodiment, the epoxidized unsaturated isoolefin copolymer may be utilized in situ in a compound produced during the production of the epoxidized unsaturated isoolefin copolymer. When the epoxidized unsaturated isoolefin copolymer is utilized in situ, acid may be added to and mixed in the epoxidized unsaturated isoolefin copolymer to disperse the acid therein to form a polymer compound comprising the epoxidized unsaturated polymer and the acid. In another embodiment, the acid may be produced as a side product in the production of the epoxidized unsaturated isoolefin copolymer to directly form a polymer compound comprising the epoxidized unsaturated isoolefin copolymer and the acid.

Prior art processes to form hydroxylated unsaturated isoolefin copolymers produce allylic alcohol functionalized unsaturated polymers where the hydroxyl groups are in exo configurations. In the present process, the polymer compound may comprise unsaturated isoolefin copolymers with hydroxyl groups in exo configurations (allylic alcohol), unsaturated isoolefin copolymers with hydroxyl groups in endo configurations, unsaturated isoolefin copolymers with hydroxyl groups in both exo and endo configurations, or mixtures thereof.

Conversion of epoxide functional groups on the epoxidized unsaturated isoolefin copolymer to hydroxyl functional groups in the presence of a catalytic amount of the acid may be accomplished at ambient temperature (e.g. room temperature) or greater. The type of product formed may be controlled by a balance between temperature and acid strength. The use of stronger acids at relatively lower temperatures leads to ring opening and the formation of hydroxylated unsaturated isoolefin copolymers, but further leads to self-crosslinking and the formation of a cross-linked network of isoolefin copolymers. Effectively, the stronger acid cures the epoxidized unsaturated isoolefin copolymers, the curing being accomplished at lower temperatures than hitherto possible for butyl rubber or functionalized butyl rubber. The use of weaker strength acids leads to epoxide ring opening and the production of hydroxylated unsaturated isoolefin copolymers, which may be isolated cleanly with little or no crosslinked product with appropriate temperature and time control. Weaker acids may also lead to crosslinking at higher temperatures.

The temperature at which the acid is contacted with epoxidized unsaturated isoolefin copolymer is preferably in a range of from ambient temperature to about 250° C. If the acid has a pKa less than or equal to about 3, the epoxidized unsaturated isoolefin copolymer may be crosslinked at temperatures less than or equal to about 250° C. If the acid has a pKa less than or equal to about 1, the epoxidized unsaturated isoolefin copolymer may be crosslinked at temperatures as low as room temperature. The temperature used to crosslink the epoxidized unsaturated isoolefin copolymer may be guided by application requirements.

When a crosslinked network is the desired product and a stronger acid is used, the temperature is desirably about 20° C. or greater and about 100° C. or lower. More preferably the temperature is about 25° C. or greater. More preferably the temperature is about 75° C. or lower, even more preferably about 60° C. or lower.

When a crosslinked network is the desired product and a weaker acid is used, the temperature is desirably about 160° C. or greater. Preferably, the temperature is about 250° C. or lower. More preferably the temperature is about 160° C. or greater and about 200° C. or lower.

When a hydroxylated unsaturated isoolefin copolymer is the desired product and a weaker acid is used, the temperature is desirably about 180° C. or lower, or about 160° C. or lower. Preferably, the temperature is about 60° C. or higher, or about 100° C. or higher, or about 140° C. or higher.

Production of the product is relatively fast. Production of the product may occur within about 2 hours or less, or even about 1 hour or less, or even about 30 minutes or less, or even about 10 minutes or less or even about 5 minutes or less. Production time depends to some extent on temperature; therefore reactions performed at higher temperature may take less time. The time for reactions intended to produce hydroxylated unsaturated isoolefin copolymers is especially influenced by the temperature.

The acid is used in a catalytic amount. A catalytic amount is preferably in a range of about 0.01-10 phr (part per hundred of rubber), more preferably in a range of 0.1-7 phr. Stronger acids are acids having a pKa of about 1 or lower. Weaker acids have a pKa of greater than about 1. Some examples of stronger acids include sulfonic acids, for example p-toluenesulfonic acid (PTSA, pKa −2.80), methanesulfonic acid (pKa −2.0) and mixtures thereof. Some examples of weaker acids include salicylic acid (pKa 2.97), benzoic acid (pKa 4.2), an analogue of benzoic acid, acetic acid and mixtures thereof. Preferred weaker acids include benzoic acid, an analogue of benzoic acid or a $C_1$-$C_7$ alkanoic acid. Preferred weaker acids comprise a compound of formula (I) or (II):

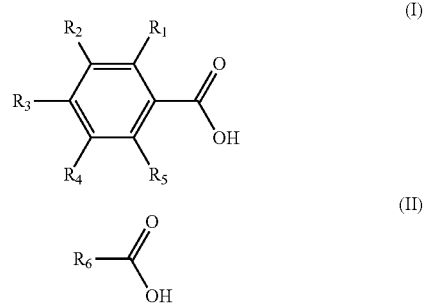

where $R_1$, $R_2$, $R_3$, $R_4$ and $R_5$ are independently hydrogen, methyl, ethyl, phenyl, chloro or bromo, and $R_6$ is hydrogen, methyl, ethyl, propyl, butyl, pentyl or hexyl. Preferably, one of $R_1$, $R_2$, $R_3$, $R_4$ and $R_5$ is chloro. Preferably four of $R_1$, $R_2$, $R_3$, $R_4$ and $R_5$ are hydrogen. The benzoic acid or analogue of benzoic acid preferably comprises meta-chlorobenzoic acid (mCBA, pKa 3.81). The $C_1$-$C_7$ alkanoic acid preferably comprises acetic acid.

Epoxidized Unsaturated Isoolefin Copolymer.

The epoxidized unsaturated isoolefin copolymer may be produced by at least partial epoxidation of an unsaturated isoolefin copolymer by any suitable method. A variety of methods for epoxidizing unsaturated isoolefin copolymer are known in the art. For example, it is known that the unsaturated isoolefin copolymer may be treated with a hydrogen peroxide precursor, often with the aid of a catalyst, to epoxidize ethylenic bonds in the unsaturated isoolefin copolymer. Catalysts may include, for example, transition metal complexes such as Ziegler/Natta-type catalysts (e.g. neodymium-based), molybdenum complexes (e.g. molybdenum naphthenate), vanadium complexes (e.g. acetylacetone vanadium complex) titanium complexes, tungsten compounds (e.g. tungsten oxide) and mixtures thereof.

The treatment may be performed in a solvent or in an absence of a solvent. Whether the treatment is in a solvent or in an absence of a solvent, a suitable mixer may be utilized during the treatment to disperse the hydrogen peroxide precursor in the unsaturated isoolefin copolymer. Producing the epoxidized unsaturated isoolefin copolymer in a solid state reaction in an absence of a solvent is preferred. The unsaturated polymer may be in a solid state, but typically has sufficient plasticity to permit mixing with the hydrogen peroxide precursor. Suitable mixers include, for example, paddle mixers, sonic agitators, mills (e.g. ball mills, roll mills), Banbury™ mixers, Brabender™ mixers, extruders (e.g. single screw, twin screw), rotary mixers and the like. Once produced, the epoxidized unsaturated isoolefin copolymer may be first isolated, and possibly purified, before contacting with acid, or may be contacted in situ with acid to form the product.

Hydrogen peroxide precursors suitable for epoxidizing the unsaturated isoolefin copolymer include, but are not limited to, hydrogen peroxide, inorganic peroxides, organic peroxides and mixtures thereof. Organic peroxides or mixtures thereof are preferred. Some organic peroxides include, for example, alkyl peroxides, alkyl hydroperoxides (e.g. tert-butyl hydroperoxide, ethyl hydroperoxide), peroxy acids and mixtures thereof. Peroxy acids or mixtures thereof are preferred. Peroxy acids or mixtures thereof are preferred. Some peroxy acids include, for example, peroxybenzoic acid, analogues of peroxybenzoic acid, peroxyacetic acid, peroxybenzoic acid, trifluoroperoxyacetic acid, magnesium mono-peroxyphthalate or mixtures thereof. Organic peroxy acids which are compounds of formula (III) or (IV) are preferred:

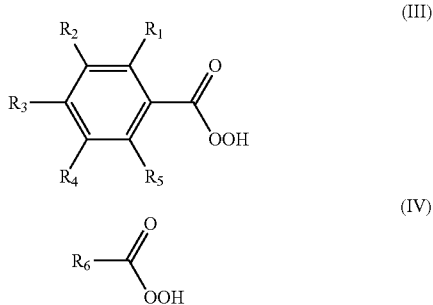

where $R_1$, $R_2$, $R_3$, $R_4$ and $R_5$ are independently hydrogen, methyl, ethyl, phenyl, chloro or bromo, and $R_6$ is hydrogen, methyl, ethyl, propyl, butyl, pentyl or hexyl. Preferably, one of $R_1$, $R_2$, $R_3$, $R_4$ and $R_5$ is chloro. Preferably four of $R_1$, $R_2$, $R_3$, $R_4$ and $R_5$ are hydrogen. The peroxy acid preferably comprises meta-chloroperoxybenzoic acid (mCPBA) or peracetic acid. Of particular note are peroxy acids of formula (III) or (IV) because the use of such peroxy acids to epoxidize the unsaturated polymer results in the production of acids of formula (I) or (II) as side products, and the presence of acids of formula (I) or (II) already well-dispersed in the epoxidized unsaturated polymer compounds removes the need to add and mix the acid to effect epoxide ring-opening.

In using a peroxy acid to epoxidize the unsaturated isoolefin copolymer, the unsaturated isoolefin copolymer is preferably mixed with the peroxy acid at a temperature at or above ambient temperature. Ambient temperature is the temperature at which the unsaturated isoolefin copolymer is being mixed with the peroxy acid in an absence of externally applied heating. The mixing process itself provides heat, which aids in the mixing process by softening the polymer. To reduce the chance of polymer degradation, it is preferable to mix the unsaturated isoolefin copolymer with the peroxy acid at a temperature of no more than about 95° C., more preferably no more than about 75° C., more preferably no more than about 65° C. and more preferably no more than about 50° C. While the act of mixing may raise the ambient temperature to about 30° C. or even higher, in some embodiments it may be desirable to apply more heat to raise the temperature even higher. In some embodiments, the unsaturated isoolefin copolymer may be mixed with the peroxy acid at a temperature in a range of ambient temperature to about 95° C., in a range of ambient temperature to about 75° C., or in a range of ambient temperature to about 50° C. In some embodiments, unsaturated isoolefin copolymer may be mixed with the peroxy acid at a temperature in a range of about 20° C. to about 95° C., or in a range of about 30° C. to about 50° C. In one preferred embodiment, the temperature at which the unsaturated isoolefin copolymer is mixed with the peroxy acid is ambient temperature in an absence of externally applied heating.

The unsaturated isoolefin copolymer is preferably mixed with the peroxy acid for a length of time less than about 4 hours, more preferably less than about 1 hour, yet more preferably less than about 0.5 hour. In one embodiment, the length of time may be about 10 minutes or less. In another embodiment, the length of time may be about 5 minutes or less. In some embodiment, the length of time may be 30 seconds or more, or 1 minute or more, or 2 minutes or more.

The peroxy acid is preferably mixed with the unsaturated polymer in an absence of solvent. The unsaturated polymer is in a solid state; however, the unsaturated polymer typically has sufficient processability in a mixer to permit mixing with the peroxy acid. The peroxy acid may be a solid or a liquid. Peroxy acid in the solid state is preferred. Mixing of solid unsaturated isoolefin copolymer and peroxy acid may be accomplished using any suitable mixer in the art. Some examples of mixers for polymers and polymer additives include mills (e.g. roll mills, ball mills), blade mixers, internal mixers (e.g. Banbury™ and Brabender™ mixers), extruders (twin screw, single screw) and the like. Mills are particularly preferred. With a view to effective mixer capacity and the amount of unsaturated isoolefin copolymer and peroxy acid used, the time, temperature and shear while mixing may be controlled to optimize conversion efficiency.

The peroxy acid may be used in an amount considerably less than in other solid state epoxidation processes in the art. The peroxy acid is preferably used in an amount of about 5 mol % or less equivalents to unsaturation, even about 3 mol % or less equivalents to unsaturation, while having high conversion efficiency of the unsaturated isoolefin copolymer to the epoxidized polymer. In some embodiments, suitable amounts of the peroxy acid are in a range of 0.1-5 mol %, or 0.4-4 mol % or 0.7-3 mol % equivalents to unsaturation.

For enhanced control over fast kinetics of the epoxidation reaction, a masterbatch approach to mixing is preferred. In this approach, the peroxy acid may be supported on a support matrix, for example a matrix comprising a saturated polymer, and the supported peroxy acid mixed with unsaturated isoolefin copolymer. The saturated polymer preferably comprises a saturated elastomer. Some examples of saturated polymers include polyisobutylene (IB), epichlorohydrin rubber (ECO), polyacrylic rubber (ACM, ABR), silicone rubber (SI, Q, VMQ), fluorosilicone rubber (FVMQ), fluoroelastomers (FKM, and FEPM), perfluoroelastomers (FFKM), polyether block amides (PEBA), chlorosulfonated polyethylene (CSM), ethylene-vinyl acetate (EVA) or mixtures thereof. The saturated polymer preferably comprises a polyisobutylene. Low or medium molecular weight polyisobutylenes are preferred.

Using a peroxy acid as described above to epoxidize the unsaturated isoolefin copolymer may have one or more advantages including requiring no solvent, requiring no catalyst, requiring no or little applied external heat input, requiring no applied cooling, requiring less epoxidation agent, being faster, and/or resulting in more efficient conversion of the polymer.

The unsaturated isoolefin copolymer preferably comprises repeating units derived from at least one isoolefin monomer and repeating units derived from at least one multiolefin monomer.

The isoolefin copolymer is not limited to a special isoolefin. However, isoolefins within the range of from 4 to 16 carbon atoms, preferably 4-7 carbon atoms, such as isobutene, 2-methyl-1-butene, 3-methyl-1-butene, 2-methyl-2-butene, 4-methyl-1-pentene and mixtures thereof are preferred. More preferred is isobutene (isobutylene).

The isoolefin copolymer is not limited to a special multiolefin. Every multiolefin copolymerizable with the isoolefin known by the skilled in the art can be used. However, multiolefins within the range of from 4-14 carbon atoms, such as isoprene, butadiene, 2-methylbutadiene, 2,4-dimethylbutadiene, piperyline, 3-methyl-1,3-pentadiene, 2,4-hexadiene, 2-neopentylbutadiene, 2-methly-1,5-hexadiene, 2,5-dimethly-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene and mixtures thereof, preferably conjugated diener, are used. Isoprene is more preferably used. The unsaturated polymer useful in the present invention may include a co-monomer other than the above referenced multiolefins, such as an alkyl-substituted vinyl aromatic co-monomer, including but not limited to a $C_1$-$C_4$ alkyl substituted styrene, for example para-methylstyrene.

As optional monomers, any monomer copolymerizable with the isoolefins and/or dienes known by the skilled in the art can be used. α-methyl styrene, p-methyl styrene, chlorostyrene, cyclopentadiene and methylcyclopentadiene are preferably used. Indene and other styrene derivatives may also be used. The unsaturated polymer can include, for example, random copolymers of isobutylene, isoprene and para-methyl styrene.

In one embodiment, the isoolefin copolymer may be formed by copolymerization of a monomer mixture. Preferably, the monomer mixture comprises about 80-99.9 mol % of at least one isoolefin monomer and about 0.1-20 mol % of at least one multiolefin monomer, based on the monomers in the monomer mixture. More preferably, the monomer mixture comprises about 90-99.9 mol % of at least one isoolefin monomer and about 0.1-10 mol % of at least one multiolefin monomer. In one embodiment, the monomer mixture comprises about 92.5-97.5 mol % of at least one isoolefin monomer and about 2.5-7.5 mol % of at least one multiolefin monomer. In another embodiment, the monomer mixture comprises about 97.4-95 mol % of at least one isoolefin monomer and about 2.6-5 mol % of at least one multiolefin monomer.

If the monomer mixture comprises the optional monomer copolymerizable with the isoolefins and/or dienes, the optional monomer preferably replaces a portion of the multiolefin monomer. The monomer mixture may also comprise from 0.01% to 1% by weight of at least one multiolefin cross-linking agent, and when the multiolefin cross-linking agent is present, the amount of multiolefin monomer is reduced correspondingly.

The isoolefin copolymer may be formed by copolymerization of a monomer mixture, for example by solution polymerization. A solution polymerization reaction is performed in the presence of an initiator system (e.g. a Lewis acid catalyst and a proton source) capable of initiating the polymerization process. A proton source suitable in the present invention includes any compound that will produce a proton when added to the Lewis acid or a composition containing the Lewis acid. Protons may be generated from the reaction of the Lewis acid with proton sources to produce the proton and the corresponding by-product. Such reaction may be preferred in the event that the reaction of the proton source is faster with the protonated additive as compared with its reaction with the monomers. Proton generating reactants include, for example such as water, alcohols, phenol thiols, carboxylic acids, and the like or any mixture thereof. Water, alcohol, phenol or any mixture thereof is preferred. The most preferred proton source is water. A preferred ratio of Lewis acid to proton source is from 5:1 to 100:1 by weight, or from 5:1 to 50:1 by weight. The initiator system including the catalyst and proton source is preferably present in the reaction mixture in an amount of 0.02-0.1 wt %, based on total weight of the reaction mixture.

Alkyl aluminum halide catalysts are a particularly preferred class of Lewis acids for catalyzing solution polymerization reactions in accordance with the present invention. Examples of alkyl aluminum halide catalysts include methyl aluminum dibromide, methyl aluminum dichloride, ethyl aluminum dibromide, ethyl aluminum dichloride, butyl aluminum dibromide, butyl aluminum dichloride, dimethyl aluminum bromide, dimethyl aluminum chloride, diethyl aluminum bromide, diethyl aluminum chloride, dibutyl aluminum bromide, dibutyl aluminum chloride, methyl aluminum sesquibromide, methyl aluminum sesquichloride, ethyl aluminum sesquibromide, ethyl aluminum sesquichloride and any mixture thereof. Preferred are diethyl aluminum chloride ($Et_2AlCl$ or DEAC), ethyl aluminum sesquichloride ($Et_{1.5}AlCl_{1.5}$ or EASC), ethyl aluminum dichloride ($EtAlCl_2$ or EADC), diethyl aluminum bromide ($Et_2AlBr$ or DEAB), ethyl aluminum sesquibromide ($Et_{1.5}AlBr_{1.5}$ or EASB) and ethyl aluminum dibromide ($EtAlBr_2$ or EADB) and any mixture thereof. In a particularly preferred initiator system, the catalyst comprises ethyl aluminum sesquichloride, preferably generated by mixing equimolar amounts of diethyl aluminum chloride and ethyl aluminum dichloride, preferably in a diluent. The diluent is preferably the same one used to perform the copolymerization reaction.

One or more other catalysts useful in solution copolymerization of isoolefins may also be present in the initiator system, for example titanium tetrachloride, stannous tetrachloride, boron trifluoride, boron trichloride, or methylalumoxane. The monomers are generally polymerized cationically, preferably at temperatures in the range of from about −100° C. to about −50° C., preferably in the range of from about −95° C. to about −65° C. The temperature is preferably about −80° C. or greater.

The solution comprises 0-30 vol % of an aliphatic hydrocarbon diluent, based on volume of the solution. In preferred embodiments, the solution comprises 0.1-30 vol % or 0.1-20 vol % of the aliphatic hydrocarbon diluent. The aliphatic hydrocarbon may be in a common aliphatic medium comprising at least 80 wt % of one or more aliphatic hydrocarbons having a boiling point in the range of 45° C. to 80° C. at a pressure of 1013 hPa, preferably at least 90 wt %, and even more preferably at least 95 wt %. Aliphatic hydrocarbons having a boiling point in the range of 45° C. to 80° C. at a pressure of 1013 hPa include cyclopentane, 2,2-dimethylbutane, 2,3-dimethylbutane, 2-methylpentane, 3-methylpentane, n-hexane, methylcyclopentane and 2,2-dimethylpentane.

A C6 solvent is a particularly preferred choice for use in a solution process. A lower molecular weight solvent, such as C5 or lighter, has a boiling point close to the monomers and the monomers therefore may not be separable from the solution by distillation. A higher molecular weight solvent, such as C7 or heavier, would be more difficult to separate from the rubber after halogenation. The solution viscosity provided by use of a C7 solvent is also significantly higher than with a C6 solvent, making the solution more difficult to handle and impeding heat transfer in the reactor, even when provided with the high monomer to solvent ratios described above. As a result, the C6 solvents of the present invention are a preferred selection from among the available solvents.

C6 solvents suitable for use in the present invention preferably have a boiling point of between 50° C. and 69° C. Examples of preferred C6 solvents include n-hexane or hexane isomers, such as 2-methyl pentane or 3-methyl pentane, or mixtures of n-hexane and such isomers as well as cyclohexane. The common aliphatic medium may, for example, further comprise other compounds which are inert under polymerization conditions such as other aliphatic hydrocarbons, for example heptanes and octanes having a boiling point of more than 80° C. at a pressure of 1013 hPa, propanes, butanes, n-pentane, cyclohexane as well as halohydrocarbons such as methylchloride, hydrofluorocarbon (HFC) and other halogenated aliphatic hydrocarbons which are inert under reaction conditions.

Copolymerization process may be performed as a batch process in a batch reactor or a continuous process (e.g. a plug flow process) in a continuous reactor. In a continuous process, the process is preferably performed with at least the following feed streams: solvent/diluent+isoolefin (preferably isobutene)+multiolefin (preferably diene, isoprene); initiator system; and, optionally, a multiolefin cross-linking agent.

It should be noted that the multiolefin crosslinking agent can also be added in the same feed stream as the isoolefin and multiolefin. While cross-linking agents are not necessary to increase molecular weight of the copolymer to a processable level, cross-linking agents may nevertheless be used if desired.

To form a halogenated isoolefin copolymer, the isoolefin copolymer may be subjected to a halogenation process. Bromination or chlorination can be performed according to a process known by those skilled in the art, for example, the procedures described in Rubber Technology, 3rd Ed., Edited by Maurice Morton, Kluwer Academic Publishers, pp. 297-300 and further documents cited therein. Preferably, halogenation is performed according to a process as described in U.S. Pat. No. 5,886,106 issued Mar. 23, 1999, the contents of which is herein incorporated by reference. The amount of halogenating agent added is controlled to provide a final halogen content of 0.05-2.5 mol % in the halogenated copolymer. Halogenation agents useful for halogenating isoolefin copolymer may comprise elemental chlorine ($Cl_2$) or bromine ($Br_2$) and/or organo-halide precursors thereto, for example dibromo-dimethyl hydantoin, tri-chloroisocyanuric acid (TCIA), n-bromosuccinimide, or the like. Preferably, the halogenation agent comprises or is bromine. Preferably, halogenation comprises bromination.

During halogenation of an isoolefin copolymer containing conjugated dienes, such as isoprene, some or all of the multiolefin content of the isoolefin copolymer is converted to allylic halides. The total allylic halide content of the halogenated isoolefin copolymer may not exceed the starting multiolefin content of the parent isoolefin copolymer. The allylic halide sites allow for reacting with and attaching a nucleophile to the halogenated isoolefin copolymer. For halogenated isoolefin copolymers containing no allylic halides, for example, halogenated isoolefin copolymer derived from isobutylene and styrenic monomers, benzylic halides, formed by halogenation of the styrenic monomer, may be reacted to form the ionomer rather than allylic halides. The same logic would therefore apply to benzylic halides as allylic halides; the total amount of ionomeric moieties cannot exceed the available amount of benzylic halides.

Curing:

If the acid cure system described above is not desired or an additional cure system is desired, the hydroxylated unsaturated polymer produced by the process may further be cured by any other suitable method, for example sulfur-based curatives, peroxide-based curatives, ZnO curatives, resin cure systems or UV light. A typical sulfur-based curing system comprises: (i) a metal oxide, (ii) elemental sulfur and (iii) at least one sulfur-based accelerator. The use of metal oxides as a component in the curing system is well known in the art. A suitable metal oxide is zinc oxide, which is typically used in the amount of from about 1 to about 10, preferably from about 2 to about 5, parts by weight per hundred parts by weight polymer in the composition. Elemental sulfur, comprising component (ii) of the preferred curing system is typically used in amounts of from about 0.2 to about 10 parts by weight per hundred parts by weight polymer in the composition. Suitable sulfur-based accelerators (component (iii) of the preferred curing system) are typically used in amounts of from about 0.5 to about 3 parts by weight, per hundred parts by weight polymer in the composition. Non-limiting examples of useful sulfur-based accelerators may be selected from the thiuram sulfides such as tetramethyl thiuram disulfide (TMTD), the thiocarbamates such as zinc dimethyl dithiocarbamate (ZDC) and the thiazyl and benzothiazyl compounds such as mercaptobenzothiazyl disulfide (MBTS). Preferably, the sulphur based accelerator is mercaptobenzothiazyl disulfide. In some embodiments of a resin cure system, the resin cure system may comprise a halogenated phenol formaldehyde resin or a phenol formaldehyde resin, optionally in conjunction with an activator. Halogenated phenol formaldehyde resins and phenol formaldehyde resins are known in the art as described in U.S. Pat. Nos. 2,701,895, 3,093,613 and 3,165,496, which are herein incorporated by reference. An alkyl phenol-formaldehyde derivative, for example octylphenol-formaldehyde with methylol active group, is typical. Metal oxides, for example zinc oxide, and/or other curing or processing aids (e.g. stearic acid) may also be used in the resin cure system. Metal oxides may be used in the amount of from about 1 to about 10 parts by weight per hundred parts by weight polymer in the composition. Resin may be used in amounts of from about 0.2 to about 20 phr. Other curing or processing aids may be used in amounts of from about 0.2 to about 10 phr.

UV cured samples of epoxidized or hydroxylated unsaturated isoolefin copolymer demonstrate creep characteristics at 25° C. over about 2 hours that is at least about 10 times less than for uncured samples, or even at least about 15 times less, or even at least about 20 times less, or even at least about 25 times less.

Additives:

The epoxidized or hydroxylated unsaturated isoolefin copolymer may be compounded with various auxiliary products, shaped into an article, and the resulting compound cured. Auxiliary products for polymers (e.g. rubbers) include, for example, reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts that depend, inter alia, on the intended use. Further information on vulcanization may be obtained in Encyclopedia of Polymer Science and Engineering, Vol. 17, s. 666 et seq. (Vulcanization).

In a particular embodiment, the epoxidized or hydroxylated unsaturated isoolefin copolymer may be compounded with a suitable filler (e.g. mineral and/or non-mineral fillers) to enhance certain desirable physical properties, such as tensile strength, viscosity, hardness, permeability, etc. Suitable fillers are selected from those that do not impart undesirable residues or otherwise adversely affect the polymer for use in the aforementioned "clean" applications. Examples of suitable fillers include silica, silicates, high aspect ratio or nano-sized versions thereof, and other suitable clean fillers. The selection of filler for imparting desired physical properties while retaining clean characteristics is within the purview of persons skilled in the art. Conventional amounts of fillers are from about 1 to 150 phr (parts per hundred rubber).

Uses:

The polymer products produced in accordance with the present process is useful in various products including inner liners, bladders, tubes, air cushions, pneumatic springs, air bellows, accumulator bags, hoses, conveyor belts and pharmaceutical closures, automobile suspension bumpers, auto exhaust hangers, body mounts, shoe soles, tire sidewalls and tread compounds, belts, hoses, shoe soles, gaskets, o-rings, wires/cables, membranes, rollers, bladders (e.g. curing bladders), inner liners of tires, tire treads, shock absorbers, machinery mountings, balloons, balls, golf balls, protective clothing, medical tubing, storage tank linings, electrical insulation, bearings, pharmaceutical stoppers, adhesives, a container, such as a bottle, tote, storage tank, a container closure or lid; a seal or sealant, such as a gasket or caulking; a material handling apparatus, such as an auger or conveyor belt; a cooling tower; a metal working apparatus, or any apparatus in contact with metal working fluids; an engine component, such as fuel lines, fuel filters, fuel storage tanks, gaskets, seals, etc.; a membrane, for fluid filtration or tank sealing, appliances, baby products, bathroom fixtures, bathroom safety, flooring, food storage, garden, kitchen fixtures, kitchen products, office products, pet products, sealants and grouts, spas, water filtration and storage, equipment, food preparation surfaces and equipment, shopping carts, surface applications, storage containers, footwear, protective wear, sporting gear, carts, dental equipment, door knobs, clothing, telephones, toys, catheterized fluids in hospitals, surfaces of vessels and pipes, coatings, food processing, biomedical devices, filters, additives, computers, ship hulls, shower walls, tubing, pacemakers, implants, wound dressing, medical textiles, ice machines, water coolers, fruit juice dispensers, soft drink machines, piping, storage vessels, metering systems, valves, fittings, attachments, filter housings, linings, and barrier coatings.

The polymer products are particularly useful in pharmaceutical applications (clean cure), microelectronic (transparent material), adhesives, sealants (e.g. window and bathroom caulking) and coatings.

EXAMPLES

FIG. 1 depicts a scheme showing a self-crosslinking reaction when epoxidized butyl rubber (1) is treated with a catalytic amount of a strong acid in an absence of a solvent at a temperature of about 100° C. or less. The cross-linking reaction may proceed via an epoxide ring-opening reaction to form hydroxylated butyl rubber in exo (2) and/or endo (3) configurations. However, further reaction takes place wherein the butyl rubber chains are joined together (i.e. crosslinking) perhaps via an intermolecular dehydration step to form a crosslinked network of butyl rubber chains. In essence, the scheme illustrated in FIG. 1 represents a low temperature cure system for epoxidized butyl elastomer.

Using a weaker acid permits ready termination of the reaction at the formation of hydroxylated butyl rubber, which may then be conveniently and cleanly isolated for use in further applications. However, using a weaker acid at a higher temperature may also lead to the formation of a crosslinked network of butyl rubber chains.

Figure 2:
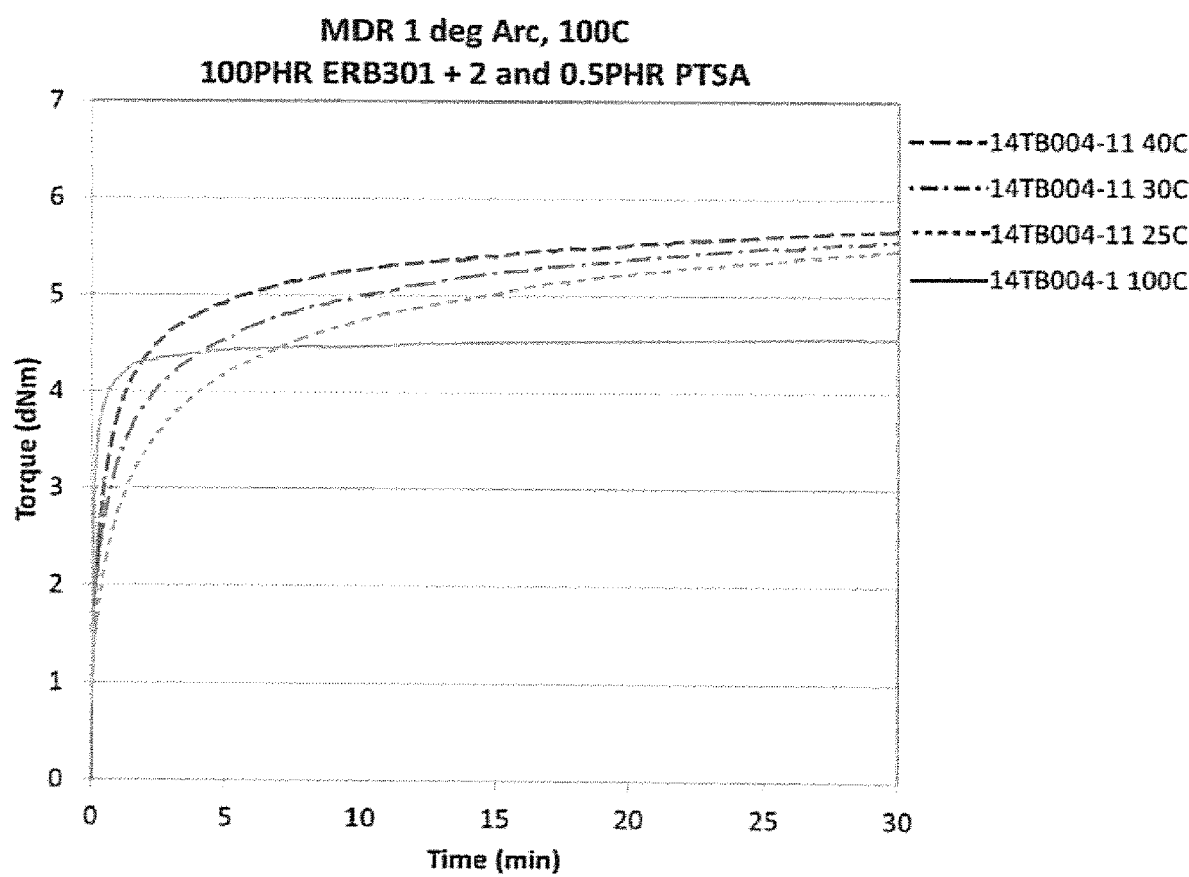
FIG. 2 depicts MDR plots (torque (dNm) vs. time (min)) at 1 arc at different temperatures (25° C., 30° C., 40° C., 100° C.) for a compound comprising 100 phr epoxidized butyl rubber (ERB301) and 0.5 phr p-toluenesulfonic acid (PISA).

Example 1: Strong Acid Cure System for Epoxidized Butyl Rubber 100 phr epoxidized butyl rubber (ERB301) was dry compounded with 0.5 phr of solid p-toluenesulfonic acid (PTSA) to produce a compound comprising the ERB301 and PTSA dispersed therein. Cure profiles of the compound were then determined in a moving die rheometer (MDR) using ASTM D5289 test procedure at 25° C., 30° C., 40° C. and 100° C. The results are shown in FIG. 2. As seen in FIG. 2, the compound is readily cured at temperatures of about 100° C. or lower, down to about 25° C., within 30 minutes, with the majority of the curing occurring within 10 minutes.

Example 2: Weaker Acid Cure System for Epoxidized Butyl Rubber (Epox-IIR)

An epoxidized butyl rubber (ERB301) was prepared from a butyl rubber (RB301) and a mixture of formic acid and hydrogen peroxide in solution. The ERB301 formed in this way was then isolated and purified. The purified ERB301 was then dry compounded with 6 phr meta-chlorobenzoic acid (mCBA) for 30 minutes at 140° C. in a Brabender mixer with Banbury rotors to form a hydroxylated butyl rubber (Ex. A). Ex. A comprised 0.54% exo-OH, 0.17% endo-OH, 0.74% epoxy and 0.03% conjugated diene (CDB).

Another epoxidized butyl rubber (ERB301) was prepared by dry compounding 300 g butyl rubber (RB301) with 18 g of meta-chloroperoxybenzoic acid (mCPBA) on a 6×12 mill for 5 minutes at 50° C. in producing ERB301 in this manner, meta-chlorobenzoic acid (mCBA) is produced in situ as a side product. The compound was then mixed for 30 minutes at 140° C. in a Brabender mixer with Banbury rotors to form a hydroxylated butyl rubber (Ex. B). Ex. B comprised 0.5% exo-OH, 0.1% endo-OH, 0.5% epoxy and 0.1% CDB.

Figure 3:
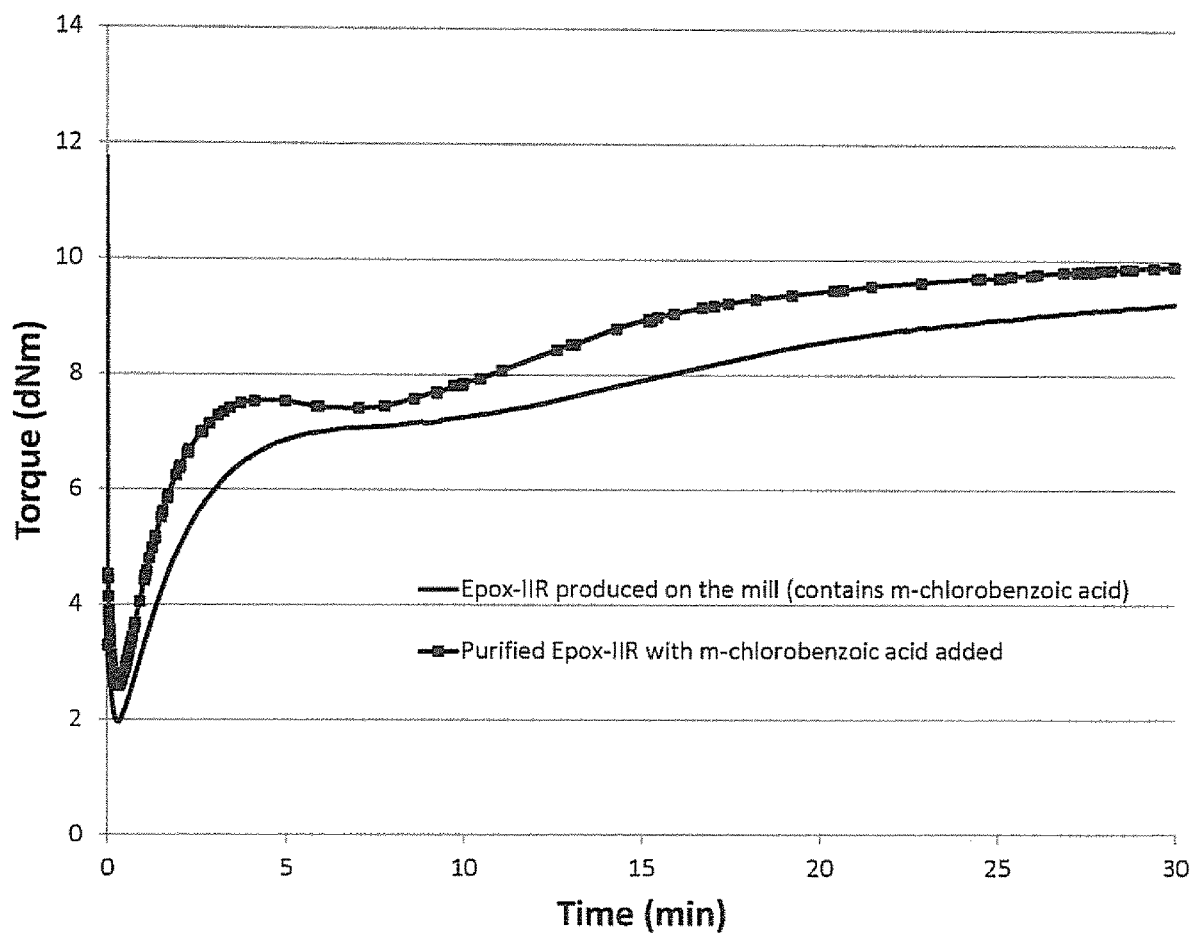
FIG. 3 depicts MDR plots (torque (dNm) vs. time (min)) at 1 arc at 180° C. for purified solution epoxidized butyl rubber cured with the addition of mCBA (trace with dark squares), and solid state epoxidized butyl rubber cured with mCBA formed in situ during the production of the epoxidized butyl rubber (trace with no squares).

Cure profiles of Ex. A and Ex. B were then determined in a moving die rheometer (MDR) using ASTM D5289 test procedure at 180° C. The results are shown in FIG. 3. As seen in FIG. 3, epoxidized butyl rubber produced by dry compounding butyl rubber with mCPBA to produce in situ mCBA gives a similar cure curve to purified epoxidized butyl rubber that has mCBA added prior to compounding.

Example 3: UV Curing

Purified epoxidized butyl rubber produced in accordance with Example 2 was cured by UV treatment in the presence of a photoacid.

Figure 4:
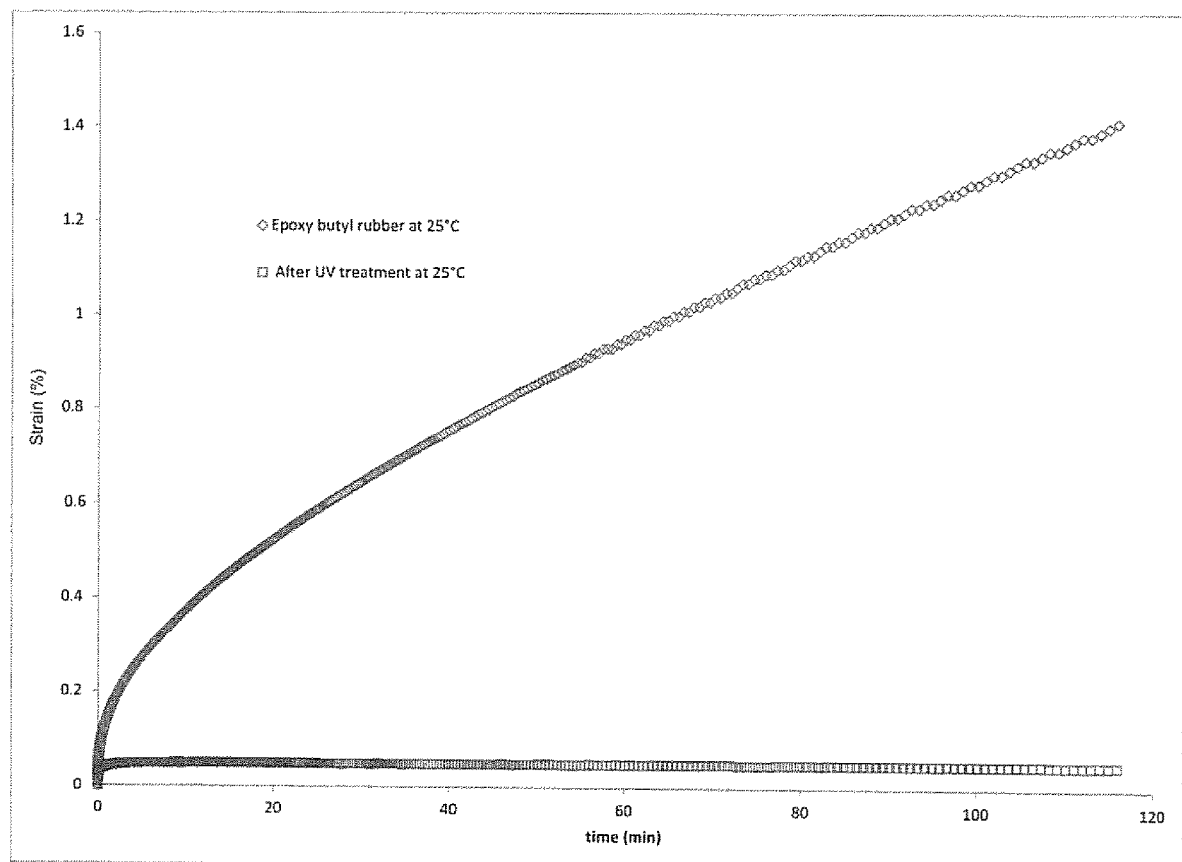
FIG. 4 depicts a graph of strain (%) vs. time (min) illustrating creep profiles for epoxidized butyl rubber before and after ultraviolet (UV) curing at 25° C.

Creep characteristics of the uncured epoxidized butyl rubber and the UV cured epoxidized butyl rubber were measured at 25° C. using an Anton Pear MC-301 rheometer in accordance with ASTM F38-00(2014). The results are illustrated in FIG. 4. It is evident from FIG. 4 that the UV cured sample exhibits very little creep over the entire 2 hour test time, whereas the uncured sample exhibits a dramatic initial rate of increase in creep which slows down over time but continues to increase.

What is claimed is:

1. A process for producing a crosslinked polymer, the process comprising steps of:
   contacting an epoxidized unsaturated isoolefin copolymer with a catalytic amount of an acid in an absence of a solvent, and
   crosslinking the epoxidized unsaturated isoolefin copolymer in the presence of the acid.

2. The process according to claim 1, wherein the acid has a pKa of about 1 or lower.

3. The process according to claim 2, wherein the crosslinking is performed at a temperature of about 20° C. to about 100° C.

4. The process according to claim 2, wherein the acid comprises a sulfonic acid optionally wherein the sulfonic acid is p-toluenesulfonic acid.

5. The process according to claim 1, wherein the acid has a pKa of greater than about 1.

6. The process according to claim 5, wherein the crosslinking is performed at a temperature of about 160° C. to about 250° C.

7. A process for producing a hydroxylated unsaturated isoolefin copolymer, the process comprising a step of:
   contacting an epoxidized unsaturated isoolefin copolymer with a catalytic amount of an acid in an absence of a solvent, wherein the epoxidized unsaturated isoolefin copolymer is hydroxylated in the presence of the acid.

8. The process according to claim 7, wherein the acid has a pKa of greater than about 1.

9. The process according to claim 8, wherein the epoxidized unsaturated isoolefin copolymer is hydroxylated at a temperature of about 60° C. to about 180° C.

10. The process according to claim 5, wherein the acid comprises a compound of formula (I):

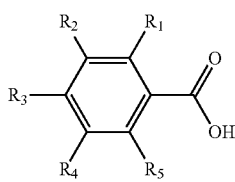

where $R_1$, $R_2$, $R_3$, $R_4$ and $R_5$ are independently hydrogen, methyl, ethyl, phenyl, chloro or bromo or in one embodiment wherein one of $R_1$, $R_2$, $R_3$, $R_4$ and $R_5$ is chloro and four of $R_1$, $R_2$, $R_3$, $R_4$ and $R_5$ are hydrogen.

11. The process according to claim 5, wherein the acid comprises a compound of formula (II):

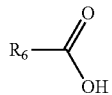

where $R_6$ is hydrogen, methyl, ethyl, propyl, butyl, pentyl or hexyl.

12. The process according to claim 5, wherein the acid is produced in situ with production of the epoxidized unsaturated isoolefin copolymer in an absence of a solvent.

13. The process according to claim 1, wherein the catalytic amount is about 0.01-10 phr.

14. The process according to claim 1, wherein the isoolefin copolymer comprises repeating units derived from at least one isoolefin monomer and repeating units derived from at least one multiolefin monomer.

15. The process according to claim 14, wherein the isoolefin monomer comprises isobutene and/or wherein the at least one multiolefin monomer comprises isoprene.

16. The process according to claim 1, wherein
   the catalytic amount is about 0.01-10 phr;
   if the acid has a pKa of about 1 or lower, the contacting is performed at a temperature of about 25° C. to about 60° C.; and
   if the acid has a pKa of greater than about 1, the contacting is performed at a temperature of about 160° C. to about 200° C.

17. The process according to claim 1, wherein:
   the acid comprises a compound of formula (II):

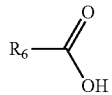

wherein $R_6$ is hydrogen, methyl, ethyl, propyl, butyl, pentyl or hexyl; and
   the isoolefin copolymer comprises repeating units derived from isobutylene, and repeating units derived from isoprene.

18. The process according to claim 1, wherein the process includes forming a hydroxylated unsaturated isoolefin copolymer comprising hydroxyl groups in endo configurations as an intermediate.

19. A process for producing a crosslinked polymer, the process comprising contacting an epoxidized unsaturated isoolefin copolymer with a catalytic amount of an acid in an absence of a solvent;
   wherein
      the acid has a pKa of greater than about 1 and the contacting is performed at a temperature of about 160° C. to about 250° C.

20. The method of claim 7, wherein the isoolefin copolymer comprises repeating units derived from at least one isoolefin monomer and repeating units derived from at least one multiolefin monomer, optionally wherein the at least one isoolefin monomer comprises isobutene and/or wherein the at least one multiolefin monomer comprises isoprene.

* * * * *